May 11, 1965

L. S. WIRT 3,182,748

HELICAL VANE FOR SOUND ABSORBING DEVICE
AND METHOD OF MAKING SAID VANE

Filed Aug. 15, 1961

INVENTOR.
LESLIE S. WIRT
BY
Francis O. Lefee
ATTORNEY

May 11, 1965 L. S. WIRT 3,182,748
HELICAL VANE FOR SOUND ABSORBING DEVICE
AND METHOD OF MAKING SAID VANE
Filed Aug. 15, 1961 3 Sheets-Sheet 2

INVENTOR.
LESLIE S. WIRT
BY
*Francis O'Befee*
ATTORNEY

P = HELIX LENGTH (360°)
r = RADIUS
a = PITCH LENGTH

INVENTOR.
LESLIE S. WIRT
BY
ATTORNEY

> # United States Patent Office

> 3,182,748
> Patented May 11, 1965

3,182,748
HELICAL VANE FOR SOUND ABSORBING DEVICE AND METHOD OF MAKING SAID VANE
Leslie S. Wirt, Phoenix, Ariz., assignor to The Garrett Corporation, Los Angeles, Calif., a corporation of California
Filed Aug. 15, 1961, Ser. No. 131,643
9 Claims. (Cl. 181—67)

This invention relates to sound attenuating ducts particularly adaptable for turbomachinery and aims to provide an efficient helical vane that may be used in a duct in a relatively confined space for effectively reducing the noise of a turbine. The invention also contemplates a method of making such a helical vane.

In certain applications of turbomachinery, including gas turbines, compressors and fans, it is desirable to reduce the noise of the machine while at the same time keeping the size, weight and possible fire hazard of any sound reducing duct at a minimum. In addition, it is important that any silencer introduce no appreciable back pressure to the turbine. Although ducts having helical passages have been suggested as an effective type of duct for sound reduction, certain difficulties have been encountered in adapting them for use with turbomachines such as gas turbines. It has been found, for example, that most helical shapes are undesirable because they create far too much back pressure in the turbine. Furthermore, the problem of shaping metal into the desired helical form is difficult, particularly with some of the materials that may be most effective for the reduction of noise.

This invention is based in part on the discovery that a helical vane for a sound attenuating duct may be shaped to match relatively closely the exhaust swirl of a turbine and conform to the streamlines already in the flow, thereby obviating the problem of back pressure. It has also been found that any suitable material, such as porous metal, may be formed into the desired helical shape by the use of a special mold or die which is congruent to and shaped according to the formula and geometry of a helix of the desired shape. Such a mold makes it possible either to form the vane material directly into a predetermined bellmouth shape or to cut a flat sheet of metal into a shape which will form a truncated cone, or a portion of such a cone, and then press this shape against the mold to deform it in a way that causes it to form easily into the desired helical shape when removed from the mold. Moeover, if the vanes are to be used in a silencing duct which has to be fitted into a limited space, a plurality of such helical vanes may be used to form a plurality of parallel sound deadening passages. An effective silencer for a gas turbine is one in which the pitch of the helical passages matches the swirl or streamlines of the exhaust gases and is at least equal to or from one to three times the average diameter of the duct in which the passages are formed.

It is therefore an important object of this invention to provide an improved helical vane for a turbine silencer and a method of making such a vane.

Another object of the invention is to provide a helical vane made of sheet metal which is preferably porous and adapted to form a sound deadening passage of helical shape.

Another object of the invention is to provide a method of making a helical vane wherein a flat blank of metal, which is cut in a shape to form a truncated cone or a portion of such a cone, may be deformed in a geometric mold so that upon removal from the mold it will easily form into the desired helical shape.

A further object of the invention is to provide a sound attenuating duct for turbomachinery in which a plurality of helical vanes made of sheet metal are arranged to form a plurality of parallel helical sound deadening passages wherein the configuration of the passages conforms substantially to the swirl pattern of the fluid exhausted from the turbomachinery.

It is another object of the invention to provide a sound attenuating duct as specified in the preceding paragraph wherein the pitch of the helical passages is at least equal to and preferably from one to three times the average diameter of the duct in which the passages are included, and in which either the duct or the vanes forming such passages are made of a porous metal for which the ratio of acoustic resistance to characteristic impedance of the fluid passing through said passages is from 0.75 to 6.0.

The above and other objects and advantages of the invention will be apparent from the following description and the accompanying drawings, in which.

When it is desired to eliminate or reduce the exhaust noise of a gas turbine, a silencer or sound attenuating duct is required and it is often necessary to fit the sound absorbing devices into a small space. In addition to the space requirements, the usual sound absorbing materials are bulky and may constitute a potential fire hazard due to the possible accumulation of fuel during faulty starting of the turbine.

Figure 1:
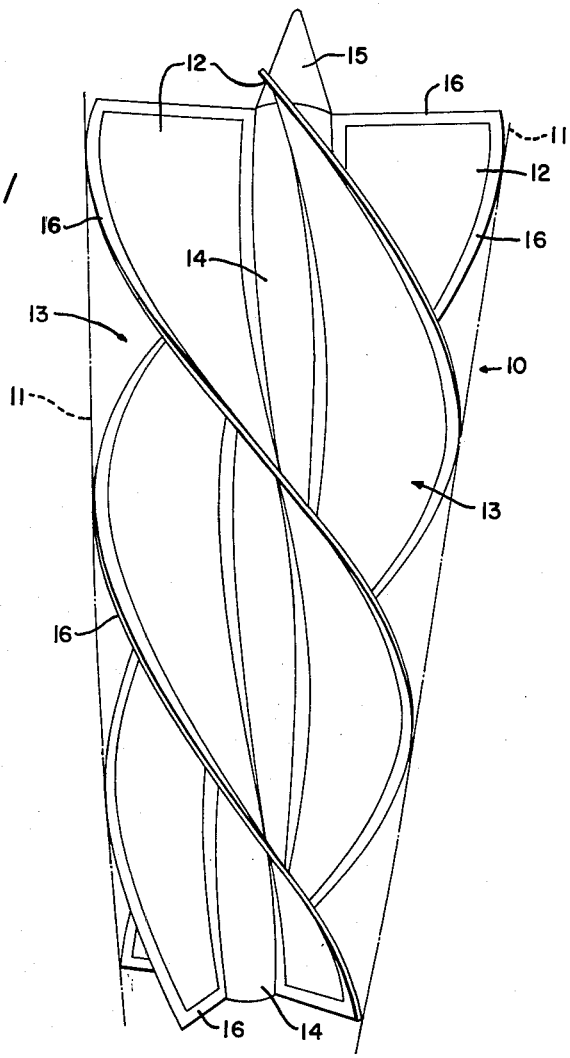
FIG. 1 is a perspective view of a helical vane assembly constructed according to the principles of this invention.

In FIG. 1 there is shown a helical vane assembly 10 for use in a relatively small conical exhaust duct or diffuser 11 which is adapted to be attached to a gas turbine (not shown). It has been suggested heretofore that helical passages lend themselves well to sound reducing applications, but when applied to gas turbine exhausts they have been found to introduce an undesirable back pressure. This resulted in the discovery that if the length of each helical turn is stretched out or elongated, the passages may be shaped to conform substantially to the swirl or streamlines of the exhaust gases. If several parallel passages are then provided, and either the vanes or the duct or both constructed of a suitable sound absorbing material, effective noise reduction may be accomplished. Accordingly, in the FIG. 1 construction the vane assembly 10 comprises a plurality of identically shaped helical vanes 12 which are arranged in parallel relation to form a plurality of parallel sound attenuating passages 13. It has been found that the optimum balance between pitch length of the helical passages and average diameter of the duct is at least 1 to 1, and sometimes up to 3 to 1, in order to provide adequate length for substantially streamline flow and yet an amount of sufficiently effective turning of the total exhaust stream to reduce noise. The term "diameter" as used herein includes the cross-sectional width of any desired shape, such as square, circular, polygonal, or the like.

The embodiment of these principles shown in FIG. 1 includes a central or axial cylindrical supporting shaft or center body 14 to which the vanes are attached. The exhaust duct 11, in the form shown, diverges throughout its length from its upstream end, which is attached to the turbine, to its downstream end where the axial support 14 terminates in a conical streamlined end portion 15. Thus, each of the vanes 12 is tapered from the upstream end to conform to the conical or diverging shape of the duct 11. In order to provide the desired noise reduction, light weight, compact size, and reduction of fire hazard, the vanes 12 (or the duct 11, or both) are preferably constructed of a suitable porous metal for which the ratio of acoustic resistance to characteristic impedance of the fluid passing through the duct is from 0.75 to 6.0. (The "characteristic impedance" is the ratio of the effective sound pressure at a given point to the effective particle velocity at that point in a free, plane, progressive sound wave. "Acoustic resistance" is a measure of flow resistance through the porous sheet metal expressed in rayls.) One type of porous metal that has been found satisfactory for the present purpose is that made by sintering and compressing fine stainless steel fibers. Such a porous material may be effectively strengthened by reinforcing all edges of each vane 12 with strips 16 of steel or other suitable strong flexible metal. These reinforcing strips also are helpful in attaching the longitudinal edges of the helical vanes, both to the axial support 14 and the exhaust housing 11.

Forming the vanes into the long helical shape shown in FIG. 1 presents problems and is an important part of this invention. The geometry of a helical vane is such that it cannot be formed from a flat metal blank, such as the blank 17 shown in FIG. 2, without stretching or compressing metal. The flat sheet metal blank which requires a minimum amount of stretching or compression is the blank 17 which is cut to form a particular truncated cone, or a portion of such a cone, but the amount of metal deformation required to shape this blank into the desired helix still presents a difficult metal working problem. This invention involves the discovery that the metal working problem may be minimized or eliminated by further forming the metal blank 17 by means of a special geometric bellmouth mold or die which is shaped in accordance with the mathematics of the helix and is congruent to the ultimate helical shape, as will now be described.

Figure 7:
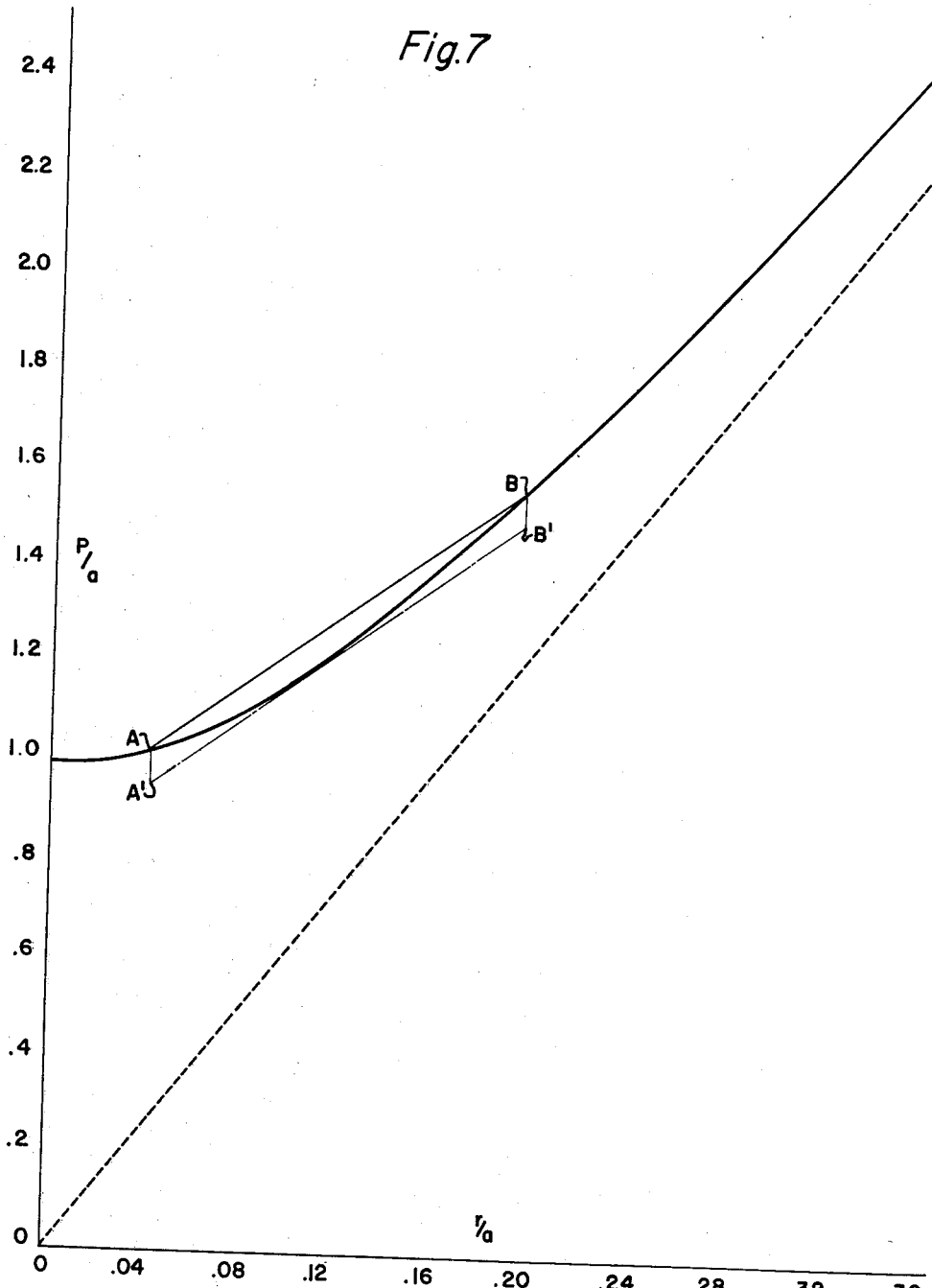
FIG. 7 is a graph of the normalized length of a 360° helix as a function of the normalized radius.

Referring now to FIG. 7, the curved line is a plot of the normalized length of a helical line as a function of the normalized radius, "normalized" meaning that the length and radius are divided by the pitch $a$. The short portion of the curve between the point A and the vertical axis is nearly straight and horizontal, and indicates that a long ribbon of metal can be twisted into a high pitch helix with little stretching or deformation of its outer edges. Similarly, the upper end of the curve at the right of FIG. 7 is also almost straight and approaches as an asymptote a line with a slope of $2\pi$, thus indicating that a large narrow sheet metal washer may readily be cut on a radial line and will then easily form into a gentle low pitch helix with little deformation of the metal. Due to the physical dimensions of the exhaust duct 11, the region of greatest interest, in connection with forming the helical vanes 12 from blank 17, is the region of more rapid curvature between points A and B on the curve. The point A on the curve shown in FIG. 7 occurs in the region of $P/a$ equals 1.02 and $r/a$ equals .04, so that the ratio of the normalized length of a helical line $(P/a)$ to the normalized radius of the vane $(r/a)$ is about 25. The point B on the curve occurs in the region of $P/a$ equals 1.56 and $r/a$ equals .19, so that the ratio of the normalized length of a helical line $(P/a)$ to the normalized radius of the vane $(r/a)$ is about 8. Any straight line, such as the line A–B, constitutes a representation of a blank, such as blank 17, which may be easily bent into a truncated cone for which the inner and outer edge lengths 18 and 19 (FIG. 2), respectively, are equal to the lengths of helixes at points A and B. At all intermediate points, however, such a blank has more metal than required by the helix. To force such a blank into a helical shape, therefore, requires that metal be compressed or gathered up endwise at all radii between A and B. It will be understood that if the line A–B, representing the truncated cone, were moved below the curve in FIG. 7 to the position A′–B′, the blank 17 would then result in a shape in which the metal between and along the edges 18 and 19 of the flat blank would have to be stretched at all radii (FIG. 7) between A′ and B′ except at the tangent point.

Figure 3:
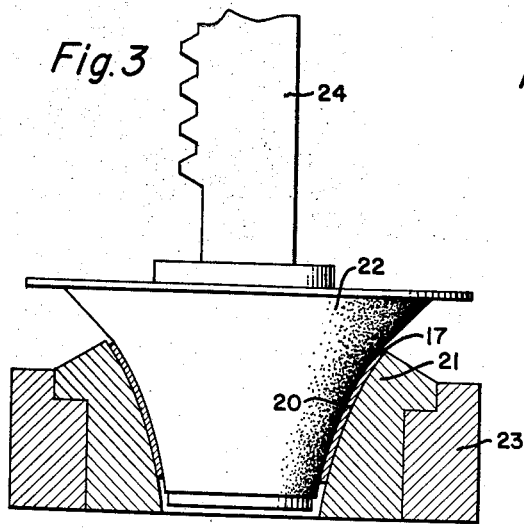
FIG. 3 is an elevational view, partly in section, of a geometric mold or die for producing a shape that is congruent to the desired shape of the helical vanes.

Further geometric analysis led to the discovery that a metal blank for a truncated cone, such as those described above, may be modified into a bellmouth shape that corresponds exactly with or is perfectly congruent to the desired helical vane. Moreover, it was found that, compensating for the material thickness, a mold or die can be made with the desired shape either to stretch or compress the metal in the blank 17, or other suitable material, to be shaped into a helical vane, so that when the material is removed from the mold it will readily form or pull out into the desired helical shape of the vanes 12. Such a die, forming part of a punch press, is illustrated in FIG. 3 where the blank 17 or other material to be shaped is shown pressed against a bellmouth surface 20 of a mold or die 21 by a correspondingly shaped resilient pressing member 22. The die is supported in a frame 23 and the pressing member is mounted on the end of an actuating arm or arbor 24.

When the blank 17 has been pressed into the shape of the bellmouth surface 20 and then removed from the die 21, it may easily be pulled out to the general shape of the helical vane 12 of FIG. 1. In order to trim and reinforce the blank for mounting in the exhaust duct 11, a welding anvil or fixture 25 having a helical surface 26 identical to the vanes 12 has been found useful. Such an anvil may be mounted on a sturdy base 27 and the preformed blank 17, after removal from the mold 21, may be pressed against this surface for final refinements. These refinements may include trimming the edges, as along the dotted line shown in FIG. 2, so that the vane will have the desired taper, and shaping and attaching the reinforcing strips 16. Such reinforcing strips are particularly useful when the blank 17 consists of a material such as porous metal of relatively low strength and ductility.

Further consideration of the geometry of the helix is desirable in order to make the bellmouth die 21, it being understood that any formula developed for such a die will be for a midline or median surface and will not take into account the thickness of the vane so that the die surface will have to be adjusted accordingly. The letters and other symbols used in the following discussion of the mathematics of the helical and bellmouth shaped surfaces may be defined as indicated below.

$r$, radial  
$z$, axial  } Polar coordinates of a helical surface  
$\theta$, angular $R$, radial  
$Z$, axial  } Polar coordinates of a bellmouth shaped surface  
$\phi$, angular $a$, The pitch length of a helix or a helical surface  
$r_A$, An inner radius of a helical surface  
$r_B$, An outer radius of a helical surface  
$P$, The length of a helical line of pitch length $a$ at any constant radius and having an angular separation $\theta$ between its beginning and termination.  
$s$, The length of a segment of a line formed by the intersection of a bellmouth shaped surface and a plane containing its axis as measured from a reference point for which $r=s=0$.

$dr, ds, dz, dZ, dR$, etc., The differential of $r, s, z, Z, R$, etc., respectively.

$\int_A^B$, Integration between the limits A and B $\log_e$, The natural logarithm of . . .
arcsinh, The angle whose hyperbolic sine is . . .
$\tan^{-1}$ = arctangent of . . .
$\pi = 3.14159$
$K, K', \zeta$, Substitution variables defined as follows:

$$K^2 = \frac{\theta^2}{(2\pi)^2}$$

$$K'^2 = 1 - K^2$$

$$\zeta = \frac{2\pi r}{a}$$

F represents an elliptic integral of the first kind
E represents an elliptic integral of the second kind.

Figure 6:
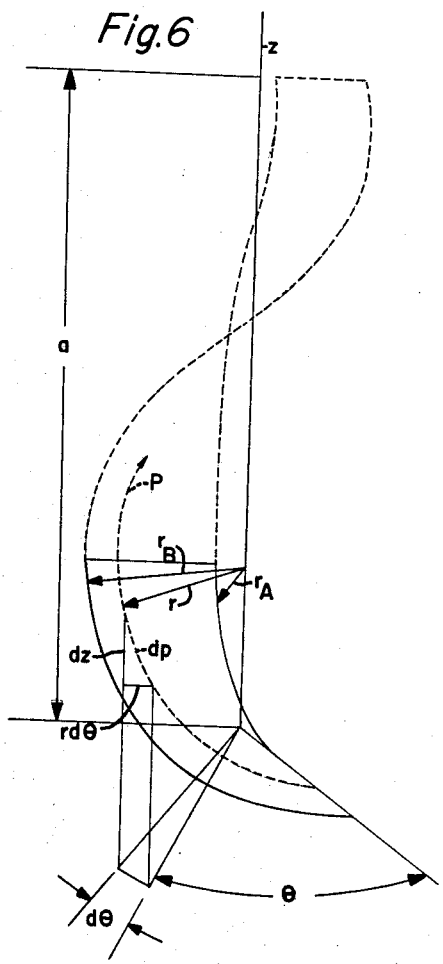
FIGS. 5 and 6 are diagrammatic views illustrating the geometry involved in making the die of FIG. 3 and the fixture of FIG. 4, respectively.

Using the symbols shown in FIG. 6, the equations of the vane, in polar coordinates, are $$z = \frac{a}{2\pi}\theta \text{ or } dz = \frac{a}{2\pi}d\theta$$

and $$0 \leq r_A \leq r \leq r_B$$

Figure 5:
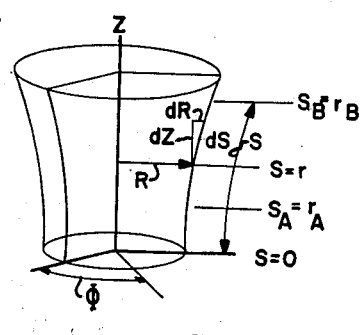

In terms of the FIG. 5 symbols, $r=s$; and if $r_A=0$ and $s=0$, it would mean that the vane would fill the entire radius $r$ of the duct; and if a center body 14 (FIG. 1) is used, $r_A$ would equal the radius of said center body.

The length of a helical line P at any constant radius $r$ is obtained by taking the line integral; thus:

$$dP^2 = dz^2 + r^2 d\theta^2$$

or $$dP = \sqrt{\frac{a^2}{(2\pi)^2} + r^2} d\theta$$

or $$P = \frac{1}{2\pi}\int_0^\theta \sqrt{a^2 + (2\pi r)^2} d\theta$$

or $$\frac{P}{a} = \frac{\theta}{2\pi}\sqrt{\left(\frac{2\pi r}{a}\right)^2 + 1}$$

Figure 2:
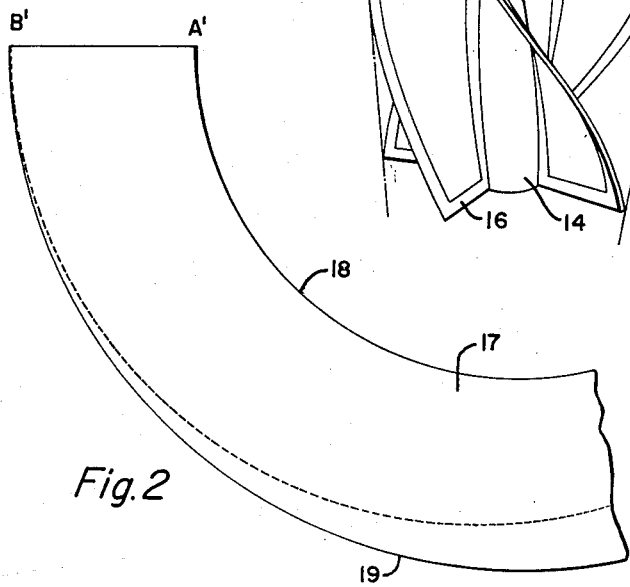
FIG. 2 is a plan view of a portion of a flat metal blank before it is shaped for forming into one of the helical vanes shown in FIG. 1.
Figure 4:
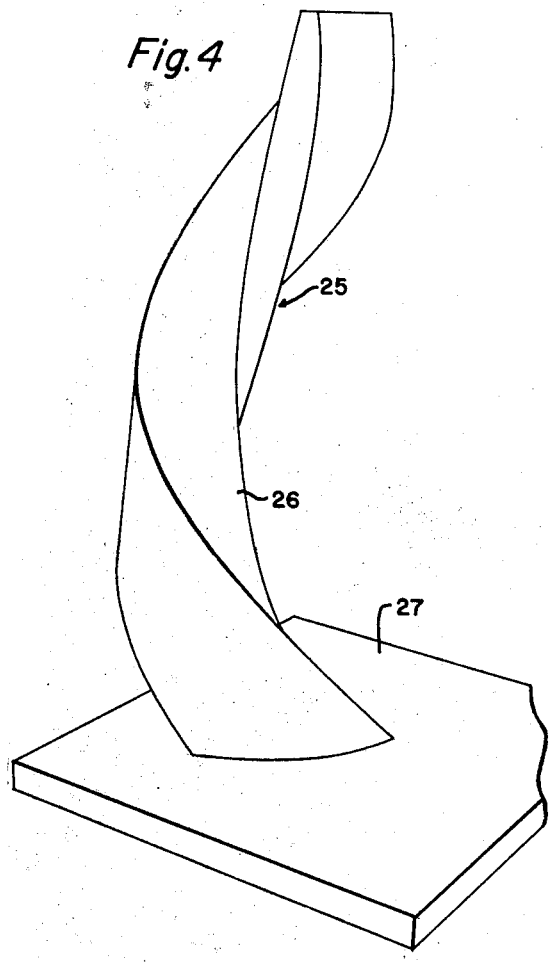
FIG. 4 is a perspective view of a geometric fixture for aiding in reinforcing and trimming the vanes after they have been shaped and removed from the FIG. 3 mold.

It has already been explained, in connection with FIG. 7, that $P/a$ is plotted against $r/a$; and it will now be apparent that the line A–B corresponds to the truncated cone blank 17 of FIG. 2 with a major diameter $P_B/\pi$ and a minor diameter $P_A/\pi$. The slope height for the truncated cone in the instance shown is equal to: $r_B - r_A$.

Referring now to FIG. 5, it will be apparent that there is a slightly modified, almost frusto-conical shape, with major and minor diameters mentioned above and a "slope height" $s$ as measured along the curve equal to $r_B - r_A$, but all intermediate points on its perimeter correspond to values of P as prescribed by the locus of FIG. 6. Such a shape is the bellmouth curve or face 20 of FIG. 3 (properly adjusted) and is the same as the profile shown in FIG. 5. In FIG. 5, $s$ is equal to $r$ on the helix of FIG. 6 and thus:

$$ds = dr$$

and the bellmouth curve may be defined as:

$$R = \frac{P}{2\pi} = \frac{a\theta}{(2\pi)^2}\sqrt{\left(\frac{2\pi r}{a}\right)^2 + 1}$$

It will be understood that in developing the measurements for the bellmouth die and face 20 of FIG. 3, allowance has to be made both for the thickness of the metal vane and for any possible spring-back when the metal is particularly resilient. It will also now be understood that the term "congruent" as used herein means that the length of a helical line P at constant radius $r$ in FIG. 6 is equal to the circumferential length of the bellmouth at the point of radius R in FIG. 5 when $r=s$. As mentioned above and shown in FIG. 5, S is the slope height or distance from the base of the bellmouth to the point of radius R along the curve of an axial section through the bellmouth.

If it is desired to construct the bellmouth die 21 of FIG. 3, it normally is not feasible to use dimensions which require measuring along the curved surface that is being made, except when using graphical methods with small increments of $r$ and correspondingly computed values of R. What is required for more practical measurements are the polar coordinates of the bellmouth, i.e., R, Φ and Z (FIG. 5)

As indicated in FIG. 5, Z may be obtained by integration, as follows:

$$ds^2 = dr^2$$

and where $s = r$, $$dZ\sqrt{1 - \left(\frac{dR}{dr}\right)^2} dr$$

$$Z = \int_0^r \sqrt{1 - \left(\frac{dR}{dr}\right)^2} dr$$

$$\frac{dR}{dr} = \frac{\theta \frac{2\pi r}{a}}{2\pi\sqrt{\left(\frac{2\pi r}{a}\right)^2 + 1}}$$

$$Z = \int_0^r \sqrt{1 - \frac{\theta^2}{(2\pi)^2}\frac{\left(\frac{2\pi r}{a}\right)^2}{1 + \left(\frac{2\pi r}{a}\right)^2}} dr$$

This equation constitutes a solution by quadrature which gives Z (FIG. 5) as a function of $r$ (FIG. 6) for any helical vane; R is of course already known as a function of $r$; and Φ will usually be 360° (or $2\pi$ radians). When Φ is less than 360°, it simply represents the case in which only a segment of the bellmouth has been used as a means of arriving at a lesser value of $\theta$ in the final vane.

In the case in which one complete bellmouth makes one complete turn of helical vane, the angle $\theta = 360° = 2\pi$ radians (FIG. 6) and Φ=360° (FIG. 5); then the last equation above becomes:

$$Z = \int_0^r \sqrt{1 - \frac{\left(\frac{2\pi r}{a}\right)^2}{1 + \left(\frac{2\pi r}{a}\right)^2}}$$

This is a commonly known integral and may be written in either of two convenient forms as:

$$Z = \frac{a}{1\pi}\operatorname{arcsinh}\frac{2\pi r}{a}$$

or $$Z = \frac{a}{2\pi} = \log_e\left[\frac{2\pi r}{a} + \sqrt{\left(\frac{2\pi r}{a}\right)^2 + 1}\right]$$

When a vane of less than one turn is desired, it can always be made by using the corresponding segment of the bellmouth. In the event that a large number of such vanes are desired with $\theta$ less than 360°, and for reasons of economy or otherwise, it is desired to use the smallest possible bellmouth; then the integral may also be evaluated in closed form, as follows:

$$Z = \int_0^r \sqrt{1 - \frac{\theta^2}{(2\pi)^2}\frac{\left(\frac{2\pi r}{a}\right)^2}{1 + \left(\frac{2\pi r}{a}\right)^2}} dr$$

Then if
$$\frac{\theta^2}{(2\pi)^2}=K^2,\ \frac{2\pi r}{a}=\zeta,\ \text{and}\ K'^2=1-K^2$$

$$Z=\frac{a}{2\pi}\int_0^\zeta \sqrt{\frac{1+K'^2\zeta^2}{1+\zeta^2}}d\zeta$$

With the aid of identities to be found, for example, in Jahnke and Emde "Tables of Functions," page 56, sections 5 and 6, the closed form solution of this integral can be written as:

$$Z=\frac{a}{2\pi}\left[\frac{2\pi r}{a}\sqrt{1-\frac{\theta^2}{(2\pi)^2}\frac{\left(\frac{2\pi r}{a}\right)^2}{1+\left(\frac{2\pi r}{a}\right)^2}}+F\left(\frac{\theta}{2\pi},\ \tan^{-1}\frac{2\pi r}{a}\right)-E\left(\frac{\theta}{2\pi},\ \tan^{-1}\frac{2\pi r}{a}\right)\right]$$

with F representing an elliptic integral of the first kind and E an elliptic integral of the second kind.

It has been mentioned above that $\Phi$ and $\theta$ most usually $=360°$, and the last equations are primarily for values of $\theta$ less than $360°$. It has been found that there is an upper limit ($\theta_{max}$) on the value of $\theta$ which may be used, as will now be shown. It is evident that $$\frac{dR}{dr}\ \text{cannot exceed unity, and}\ \frac{dR}{dr}\leq 1$$

$$\frac{\theta}{2\pi}\frac{\frac{2\pi r}{a}}{\sqrt{\left(\frac{2\pi r}{a}\right)^2+1}}\leq 1$$

$$\theta\leq 2\pi\sqrt{\frac{1+\left(\frac{a}{2\pi r}\right)^2}{1}}$$

$$\theta_{max.}=2\pi\sqrt{1+\left(\frac{a}{2\pi r_B}\right)^2}$$

Thus, if $r_B$ is very small, as in the case of a narrow ribbon, then $\theta_{max.}$ is large and many turns of helical vane can be formed from a long strip. If $r_B$ is large, as in the case of the large sheet metal washer, then $\theta_{max.}$ approaches $2\pi$ (or $360°$).

In the region of greatest interest, $\theta_{max.}$ can only moderately exceed $2\pi$ (or $360°$). If for example, $$\frac{2\pi r_B}{a}=1$$

then
$$\theta_{max.}=\sqrt{2}\ 2\pi$$

this constitutes the only limitation on the development of a bellmouth congruent to any desired helix. Otherwise, it is possible, by means of the equations referred to above, to develop a bellmouth die for any desired configuration of helical vane.

From the foregoing description, it will be understood that in many instances only a portion of the bellmouth die surface 20 (FIG. 3) may be used in shaping the desired helical vane. This would be the case when $\theta_{max.}$ is used to develop the die and this angle is greater than the total $\theta$ for the particular helical vane being shaped, or when $P<2\pi R$.

Less than the entire surface 20 of the die would also be required to shape the vane when the bellmouth surface is developed for $r_A=0$, but then $r_A>0$ in the desired helical vane, as is the case when a centerbody is use in the final sound attenuating duct. In describing the bellmouth die surface 20, the illustrative example used is one in which a horizontal section through the die is circular and the helix has a uniform pitch $a$ through its length. There may be cases, however, when it would be desirable to have the pitch change a predetermined amount for predetermined increments of length of the total duct or helical length in order to match a correspondingly shaped swirl pattern or stream line in the exhaust gases, or for any other purpose; and in such a case, a horizontal section through the die would be some irregular shape other than circular, but the length of a helical line P at constant radius $r$ would be equal to the perimeter of such irregular shape at the point on the surface thereof where $s=r$.

I claim:

1. A method of making a helical vane which comprises: pressing a blank of material from which the vane is to be formed against a bellmouth form means which is geometrically congruent with the shape of said helical vane but adjusted for the final thickness of the material, removing said material from contact with said bellmouth form means and moving the ends of the blank in opposite directions to complete the desired helical shape.

2. A method of making a helical vane which comprises: shaping a blank of material from which the vane is to be formed against an adjusted circular bellmouth form means for which $$R=\frac{P}{2\pi}=\frac{a\theta}{(2\pi)^2}\sqrt{\left(\frac{2\pi r}{a}\right)^2+1}$$

where R is the radius of the bellmouth at a point on its surface, P is both the length of the circumference of the bellmouth passing through said point and the length of a helical line at constant radius $r$, $a$ is the pitch of a helix of the desired shape, $\theta$ is the total included angle of the helix, and $r$ is the radial polar coordinate of the helix and also the curvilinear distance from the geometric base of the bellmouth to said point; removing the shaped material from contact with the bellmouth form means, and moving the ends of the blank in opposite directions to complete the helical vane.

3. A method of making a helical vane for a sound attenuating duct, which comprises cutting a flat sheet metal blank into a shape to form a truncated cone having the inner and outer edge lengths thereof corresponding to the edge lengths of the desired helical shape, bending said blank against an adjusted bellmouth form means for which the vertical polar coordinate $$Z=\int_0^r \sqrt{1-\frac{\theta^2}{(2\pi)^2}\frac{\left(\frac{2\pi r}{a}\right)^2}{1+\left(\frac{2\pi r}{a}\right)^2}}dr$$

and for which $$R=\frac{P}{2\pi}=\frac{a\theta}{(2\pi)^2}\sqrt{\left(\frac{2\pi r}{a}\right)^2=1}$$

where R is the radius of the bellmouth, at a point on its surface, P is both the length of the circumference of the bellmouth passing through said point and the length of a helical line at constant radius $r$, $a$ is the pitch of the helical shape, $r$ is the radial polar coordinate of said helical shape and also the curvilinear distance from the geometric base of the bellmouth to said point, and $\theta$ is an angle no greater than $$2\pi\sqrt{1+\left(\frac{a}{2\pi r_B}\right)^2}$$

where $r_B$ is the maximum radius of the helical vane, and moving the ends of the blank in opposite directions to complete the helical vane.

4. A sound attenuating device for reducing the exhaust noise of a gas turbine comprising a duct, a plurality of sheet metal vanes rigidly mounted in said duct, each of said vanes having a helical form and extending along the central axis of the duct, each of said vanes having a pitch length to duct cross-sectional width ratio of between 1 and 3 and having a ratio of a normalized length of a helical line on the vane at a constant radius to the normalized radius of the vane of between 25 and 8, each of said vanes conforming to the formula $$P = \frac{a\theta}{2\pi}\sqrt{\left(\frac{2\pi r}{a}\right)^2 + 1}$$

where P is the length of a helical line at constant radius r, a is the pitch of a helix of the desired shape, $\theta$ is the total included angle of the helix, and r is the radial polar coordinate of the helix whereby the edges of the vanes are substantially free of elongation and compression.

5. A vane, said vane being formed of sheet metal and having a ratio of a normalized length of a helical line on the vane at a constant radius to the normalized radius of the vane of between 25 and 8, and said vane conforming to the formula $$P = \frac{a\theta}{2\pi}\sqrt{\left(\frac{2\pi r}{a}\right)^2 + 1}$$

where P is the length of a helical line at constant radius r, a is the pitch of a helix of the desired shape, $\theta$ is the total included angle of the helix, and r is the radial polar coordinate of the helix whereby the edges of the vane are substantially free of elongation and compression.

6. A sound attenuating device for reducing the exhaust noise of a gas turbine comprising a duct, a plurality of sheet metal vanes rigidly mounted in said duct, each of said vanes having a helical form and extending along the central axis of the duct, each of said vanes having a ratio of a normalized length of a helical line on the vane at a constant radius to the normalized radius of the vane of between 25 and 8, each of said vanes conforming to the formula $$P = \frac{a\theta}{2\pi}\sqrt{\left(\frac{2\pi r}{a}\right)^2 + 1}$$

where P is the length of a helical line at constant radius r, a is the pitch of a helix of the desired shape, $\theta$ is the total included angle of the helix, and r is the radial polar coordinate of the helix whereby the edges of the vanes are substantially free of elongation and compression.

7. A device as defined in claim 4 wherein $\theta$ is an angle no greater than $$2\pi\sqrt{1 + \left(\frac{a}{2\pi r_B}\right)^2}$$

where $r_B$ is the maximum radius of said vane.

8. A vane as defined in claim 5 wherein $\theta$ is an angle no greater than $$2\pi\sqrt{1 + \left(\frac{a}{2\pi r_B}\right)^2}$$

where $r_B$ is the maximum radius of said vane.

9. A device as defined in claim 6 wherein $\theta$ is an angle no greater than $$2\pi\sqrt{1 + \left(\frac{a}{2\pi r_B}\right)^2}$$

where $r_B$ is the maximum radius of said vane.

References Cited by the Examiner

UNITED STATES PATENTS

| | | | |
|---|---|---|---|
| 1,782,396 | 11/30 | Aaron | 181—67 |
| 2,089,242 | 8/37 | Whitesell | 29—180 |
| 2,233,592 | 3/41 | Dunajeff | 29—180 |
| 2,300,130 | 10/42 | McCurdy. | |
| 2,664,062 | 12/53 | Bertsen | 113—51 |
| 2,960,950 | 11/60 | Hart | 113—51 |

FOREIGN PATENTS

| | | |
|---|---|---|
| 139,414 | 11/50 | Australia. |
| 228,315 | 5/60 | Australia. |
| 662,470 | 7/38 | Germany. |
| 829,012 | 2/60 | Great Britain. |

OTHER REFERENCES

Pages 126–128, August 10, 1959, Steel.

LEO SMILOW, *Primary Examiner.*

ALDRICH F. MEDBERY, *Examiner.*